United States Patent
Ravuna

(10) Patent No.: US 11,419,326 B2
(45) Date of Patent: Aug. 23, 2022

(54) BIRD REPELLENT SYSTEM

(71) Applicant: Tohar Ravuna, Rehovot (IL)

(72) Inventor: Tohar Ravuna, Rehovot (IL)

( * ) Notice: Subject to any disclaimer, the term of this patent is extended or adjusted under 35 U.S.C. 154(b) by 0 days.

(21) Appl. No.: 17/284,538

(22) PCT Filed: Dec. 17, 2019

(86) PCT No.: PCT/IL2019/051377
§ 371 (c)(1),
(2) Date: Apr. 12, 2021

(87) PCT Pub. No.: WO2020/136637
PCT Pub. Date: Jul. 2, 2020

(65) Prior Publication Data
US 2021/0378230 A1    Dec. 9, 2021

(30) Foreign Application Priority Data

Dec. 23, 2018   (IL) .......................................... 263921

(51) Int. Cl.
*A01M 29/32*    (2011.01)
*E04D 13/00*    (2006.01)

(52) U.S. Cl.
CPC ........... *A01M 29/32* (2013.01); *E04D 13/004* (2013.01)

(58) Field of Classification Search
CPC ............................. A01M 29/32; E04D 13/004
USPC ...................................... 52/101, 24; 119/713
See application file for complete search history.

(56) References Cited

U.S. PATENT DOCUMENTS

| | | | | |
|---|---|---|---|---|
| 5,092,088 A | * | 3/1992 | Way | .......................... E04B 1/92 52/101 |
| 5,253,444 A | * | 10/1993 | Donoho | ................. A01M 29/32 43/1 |
| 2005/0217187 A1 | * | 10/2005 | Pace | ...................... A01M 29/32 52/101 |
| 2013/0042544 A1 | * | 2/2013 | Sabine | .................. A01M 29/32 52/101 |
| 2015/0335006 A1 | * | 11/2015 | Lee | ........................ A01M 29/22 119/713 |

FOREIGN PATENT DOCUMENTS

| | | | | |
|---|---|---|---|---|
| DE | 102013108778 B4 | * | 8/2015 | ............ A01M 29/32 |
| JP | 2016106593 | | 6/2016 | |
| KR | 20130028465 A | * | 3/2013 | |

OTHER PUBLICATIONS

PCT Search Report and Written Opinion PCT/IL2019/051377, dated Mar. 26, 2020.
Prompt Pest Control Equipments, Flock Reflector Bird Deterrent, Jan. 31, 2017 https://promptpestcontrol.com/product/bird-repellent/visual-bird-repellent/flock-reflector-bird-deterrent/.
Flock Free, "Bird Control Flock Reflector in Action", Feb. 27, 2014, https://www.youtube.com/watch?v=6Ac30f_HZ7c.
Bird Control Australia, "Flock Reflector", Sep. 16, 2016 https://birdcontrolaustralia.com.au/shop/commercial-bird-deterrent/flock-reflector/.

* cited by examiner

*Primary Examiner* — Brent W Herring
(74) *Attorney, Agent, or Firm* — Dekel Patent Ltd.; David Klein

(57) ABSTRACT

A bird repellent system includes a post assembly and a fastening assembly. The post assembly includes one or more posts that protrude from a base portion. A stabilizer extends perpendicularly from the base portion or from the fastening assembly and is configured to counter a torque or force acting on the post assembly.

11 Claims, 2 Drawing Sheets

BIRD REPELLENT SYSTEM

FIELD OF THE INVENTION

The present invention relates generally to bird repellent systems and particularly to a bird repellent system with taut wires from supports.

BACKGROUND OF THE INVENTION

Bird repellant articles, devices, and systems are known in the art. Commonly known devices are installed on balconies, terraces, patios, roofs, rails and other places. Some known devices include lines suspended above the property surface at different heights. The lines are suspended by means of an array of posts.

Also known are wires and metallic spikes placed atop structures such as balconies, roofs, shopping centers and building signs to stop pigeons and other birds from landing.

A problem with such solutions is that they require skilled labor for installation and do not have any provision for adjusting to adapt to different environments and building structures.

SUMMARY OF THE INVENTION

The present invention relates to a bird repellent system with taut wires from supports that have significantly better stability, as is described more in detail hereinbelow. The supports include stabilizers that counter the torque or forces of the taut wires and ensure the supports remain stable in all conditions encountered when repelling birds.

In one aspect of the invention, the supports are adjustable to a wide variety of dimensions, and can be easily installed by the do-it-yourself person.

There is provided in accordance with an embodiment of the present invention a system including a bird repellent system including a post assembly from which extends a fastening assembly, the post assembly including one or more posts that protrude from a base portion, and a stabilizer that extends perpendicularly from the base portion or from the fastening assembly configured to counter a torque or force acting on the post assembly.

In accordance with an embodiment of the present invention the base portion is wider than a width of any of one or more posts. The base portion may be wider than a width of any of the one or more posts, and the fastening assembly may extend from the base portion.

In accordance with an embodiment of the present invention more than one bird repellent system is provided and taut wire is connected between the poles of the bird repellent systems. The stabilizer counters a torque or force from the taut wire.

In accordance with an embodiment of the present invention the fastening assembly forms an integral part of the post assembly.

In accordance with an embodiment of the present invention the fastening assembly includes a pair of legs each having a fastening member.

In accordance with an embodiment of the present invention the post assembly is pivotally movable with respect to the fastening assembly and affixable to the fastening assembly with one or more fasteners.

In accordance with an embodiment of the present invention one or more of the posts are pivotally attached to the base portion and affixable to the base portion with one or more fasteners.

In accordance with an embodiment of the present invention the post assembly is linearly movable with respect to the fastening assembly and affixable to the fastening assembly with one or more fasteners.

In accordance with an embodiment of the present invention the bird repellent systems are movable with respect to each other along a coupling member.

In accordance with an embodiment of the present invention the pole assembly is movable along a track or groove formed in the fastening assembly.

In accordance with an embodiment of the present invention the bird repellent system includes an intermediate wire support.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1A:
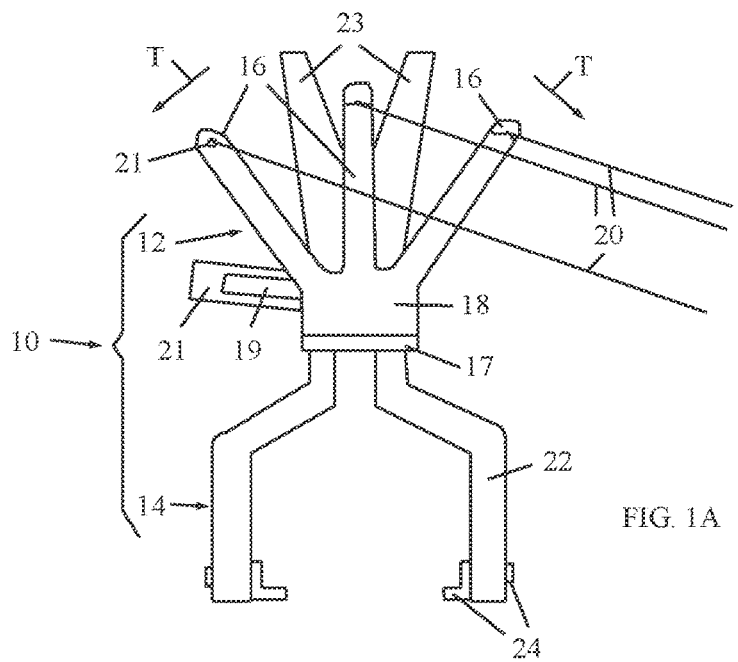
FIGS. 1A and 1B are simplified front and side-view illustrations, respectively, of a bird repellent system, constructed and operative in accordance with a non-limiting embodiment of the present invention.
Figure 1B:
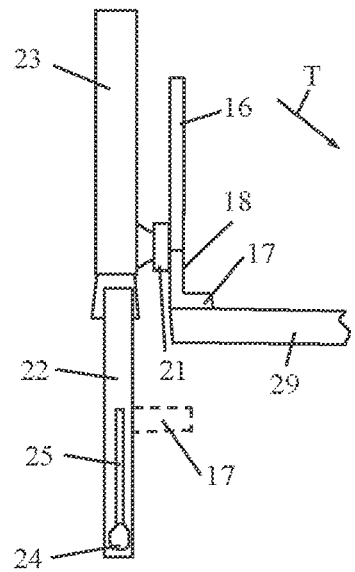

Reference is now made to FIGS. 1A-1B, which illustrate a bird repellent system 10, constructed and operative in accordance with a non-limiting embodiment of the present invention.

Bird repellent system 10 includes a post assembly (support assembly) 12, from which extends a fastening assembly 14. The post assembly 12 includes one or more posts (supports, the terms being used interchangeably) 16 that protrude from a base portion 18. In the non-limiting illustrative embodiment, there are three posts 16: a middle vertical post and two lateral posts that are tilted from the vertical, such as at angles of 30° or 45° or other angles. The base portion 18 is wider than the width of any individual post. The larger width of the base portion 18 provides strength to the post assembly 12 for pulling taut wires 20 attached to the posts 16.

Bird repellent system 10 includes one or more stabilizers 17. For example, stabilizer 17 may be a lug or other protrusion that extends perpendicularly from base portion 18; alternatively, stabilizer 17 could extend perpendicularly from fastening assembly 14 (as shown in broken lines in FIG. 1B). Stabilizer 17 counters the torque or forces of the taut wires 20 (indicated by arrows T in FIGS. 1A-1B) by abutting against a mounting surface 29 associated with or near the structure to which the bird repellent system 10 is affixed. Stabilizer 17 ensures the supports 16 remain stable in all conditions encountered when repelling birds.

Wires 20 may be tied around the periphery of post 16 or may pass through a mounting hole 21, as shown optionally on the leftmost post in FIG. 1A; other mounting possibilities are also contemplated by the invention. Wires 20 may be metallic or non-metallic (e.g., nylon filament wire).

The fastening assembly 14 extends from the base portion 18 of post assembly 12, and in FIG. 1, forms an integral part of post assembly 12. The fastening assembly 14 may include a pair of legs 22, each having a fastening member 24, such as a tightening bolt and cushioned pad for fastening onto a rail without marking or damaging the rail. The legs 22 may be jaws that are coupled to handles 23 that may be squeezed together (against the action of a spring, not shown) for clamping or otherwise fastening the legs 22 onto mounting structure, such as a rail. As seen in FIG. 1B, the fastening member 24 may be movable in a channel 25 to adjust to any mounting situation.

Accordingly, the bird repellent system 10 is a robust system that withstands the tightening forces of tightening the wires 20, without the posts 16 bending and without the fastening assembly 14 loosening from the mounting structure (e.g., rails, balcony, roof, etc.).

The present invention provides different adjustment capability with the embodiment of FIGS. 1A-1B, as is now explained below. The invention includes any combination of the adjustment capabilities described in these embodiments. First, as seen in FIGS. 1A-1B, the post assembly 12 may slide in a channel 19 of an arm 21 coupled to fastening assembly 14. This enables sliding, centering and/or tilting the posts with respect to the fastening assembly 14.

Figure 2A:
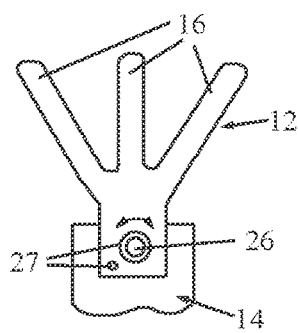
FIGS. 2A and 2B are simplified illustrations of a bird repellent system, in accordance with other non-limiting embodiments of the present invention, with angular adjustment capability.

Reference is now made to FIG. 2A. In this embodiment, post assembly 12 is pivotally attached to fastening assembly 14 about a horizontal pivot 26. This permits adjusting the angular orientation of post assembly 12 in elevation with respect to a horizontal reference base. After adjusting post assembly 12 to a desired elevational angle, post assembly 12 may be affixed with one or more tightening fasteners 27.

Figure 2B:
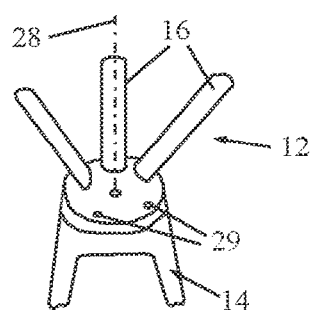

Reference is now made to FIG. 2B. In this embodiment, post assembly 12 is pivotally attached to fastening assembly 14 about a vertical pivot 28. This permits adjusting the angular orientation of post assembly 12 in azimuth about fastening assembly 14. After adjusting post assembly 12 to a desired azimuthal angle, post assembly 12 may be affixed with one or more tightening fasteners 29.

Figure 3:
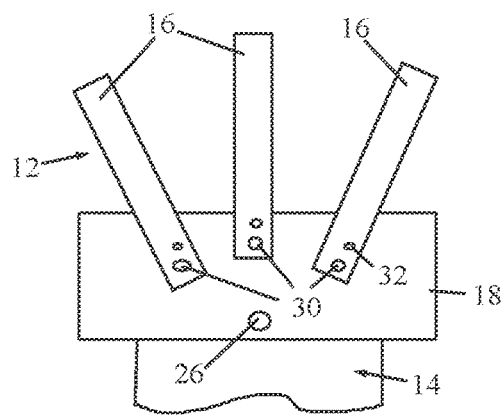
FIG. 3 is a simplified illustration of a bird repellent system, in accordance with another non-limiting embodiment of the present invention, with multiple angular adjustment capability.

Reference is now made to FIG. 3, which illustrates multiple angular adjustment capability. In this embodiment, post assembly 12 is pivotally attached to fastening assembly 14 (such as in the manner of FIG. 2A but could also be as in FIG. 2B), and one or more of the posts 16 are pivotally attached to base portion 18 of post assembly 12 about pivots 30. After adjusting the posts 16 to a desired angle, the posts 16 may be affixed with one or more tightening fasteners 32.

Figure 4:
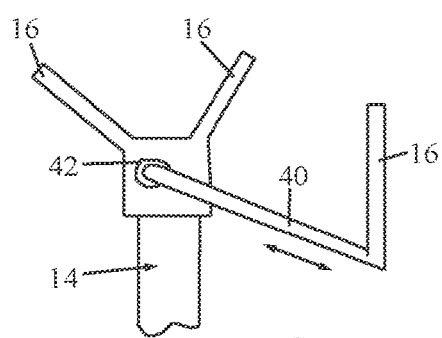
FIG. 4 is a simplified illustration of a bird repellent system, in accordance with another non-limiting embodiment of the present invention, with linear adjustment capability between individual posts of the system.

Reference is now made to FIG. 4. In this embodiment, one or more of the posts 16 is linearly adjustable with respect to another one of the posts 16. For example, one of the posts 16 may be mounted on a movable member 40 which linearly moves or slides with respect to the other posts 16. Movable member 40 may be threaded or non-threaded. After adjusting the posts 16 to a desired distance, the posts 16 may be affixed with one or more tightening fasteners 42.

Figure 5:
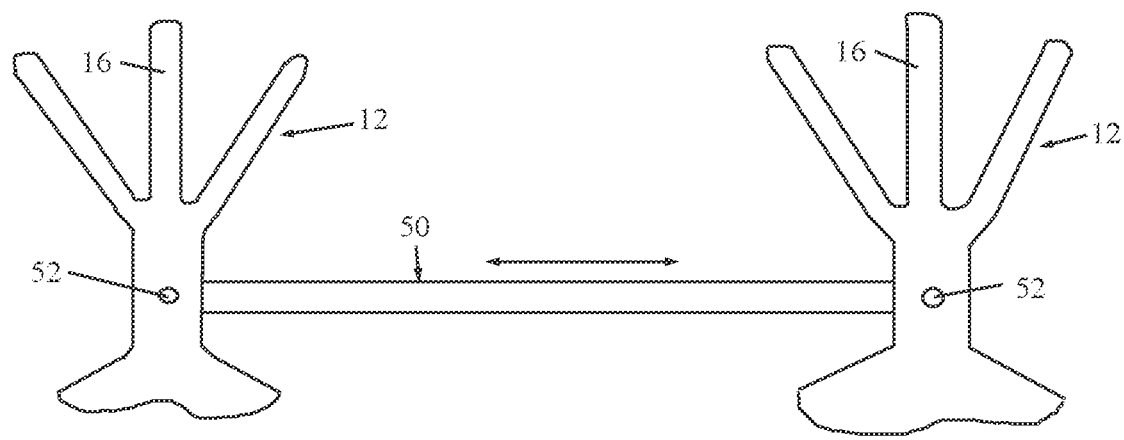
FIG. 5 is a simplified illustration of a bird repellent system, in accordance with another non-limiting embodiment of the present invention, with linear adjustment capability between neighboring pole assemblies.

Reference is now made to FIG. 5. In this embodiment, two or more bird repellent systems 10 (or just the pole assemblies 12 are movable and use a common fastening assembly 14) are coupled side-by-side with a coupling member 50. The bird repellent systems 10 can be moved linearly closer to each other or further from each other along coupling member 50. After adjusting the bird repellent systems 10 to a desired distance, they may be affixed with one or more tightening fasteners 52.

Figure 6:
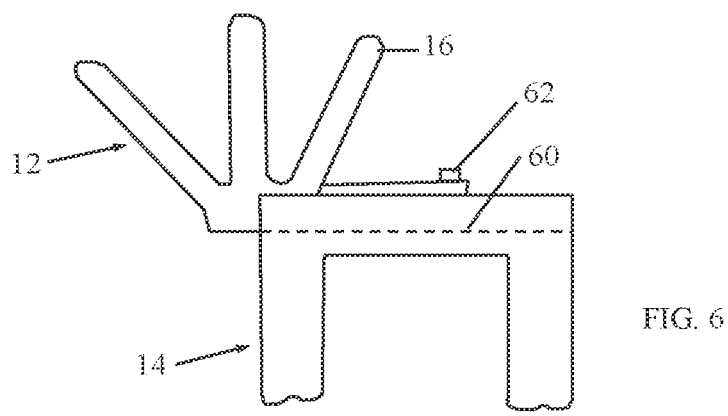
FIG. 6 is a simplified illustration of a bird repellent system, in accordance with another non-limiting embodiment of the present invention, with linear adjustment capability between a post assembly and a fastening assembly.

Reference is now made to FIG. 6. In this embodiment, one or more pole assemblies 12 are movable along a track or groove 60 formed in fastening assembly 14 and fastened in place with a fastener 62. In this manner, the pole assembly 12 can be adjusted linearly with respect to the structure to which it is fastened. For example, this permits moving the pole assembly 12 outwards or inwards from a mounting rail on a porch.

Figure 7:
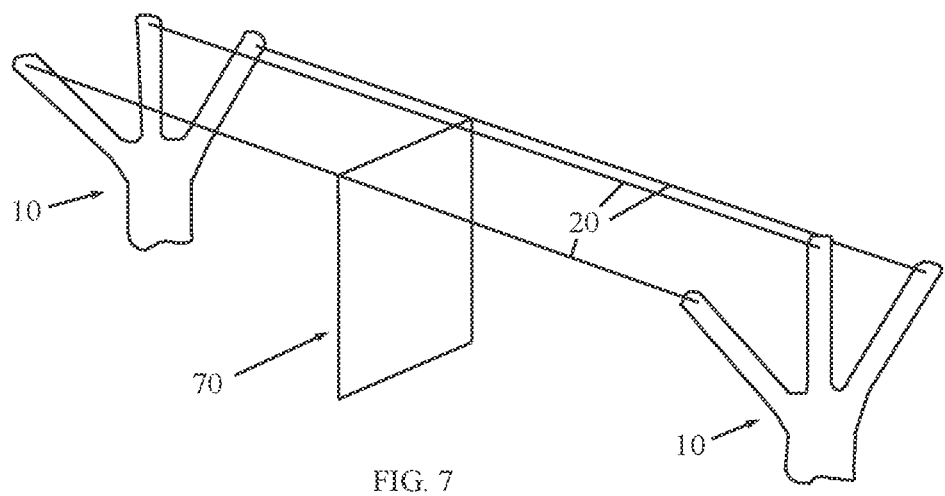
FIG. 7 is a simplified illustration of a bird repellent system, in accordance with another non-limiting embodiment of the present invention, including an intermediate wire support.

Reference is now made to FIG. 7. In this embodiment, the bird repellent system 10 includes an intermediate wire support 70, which helps prevent any slack in the wires 20 and helps keep them taut over long distances.

In this manner, the systems of the invention may be used to cover distances of over 5 meters without comprising the tightness of the wires.

The systems of the invention may be affixed to corners of buildings, patios, balconies, etc., with corner fasteners and other hardware.

What is claimed is:

1. A system comprising:
   a plurality of bird repellent systems, each comprising a post assembly and a fastening assembly, said post assembly comprising one or more posts that protrude from a base portion; and
   a stabilizer that extends perpendicularly from said base portion or from said fastening assembly configured to counter a torque or force acting on said post assembly, and wherein said bird repellent systems are movable with respect to each other along a coupling member which is positioned below said one or more posts and which extends between said base portions of said bird repellent systems, wherein said coupling member comprises a movable member placed above said fastening assembly at said base portion, and wherein said movable member linearly moves or slides with respect to said one or more posts and with respect to said fastening assembly, and said movable member is not fastened to said fastening assembly.

2. The system according to claim 1, wherein said base portion is wider than a width of any of said one or more posts.

3. The system according to claim 1, wherein taut wire is connected between said posts of the bird repellent systems and said stabilizer is configured to counter a torque or force from said taut wire.

4. The system according to claim 1, wherein said fastening assembly forms an integral part of said post assembly.

5. The system according to claim 1, wherein said fastening assembly comprises a pair of legs each having a fastening member.

6. The system according to claim 1, wherein said post assembly is pivotally movable with respect to said fastening assembly and affixable to said fastening assembly with one or more fasteners.

7. The system according to claim 1, wherein one or more of said posts are pivotally attached to said base portion and affixable to said base portion with one or more fasteners.

8. The system according to claim 1, wherein said post assembly is linearly movable with respect to said fastening assembly and affixable to said fastening assembly with one or more fasteners.

9. The system according to claim 1, further comprising one or more tightening fasteners that fasten said bird repellent systems along said coupling member at a desired distance therebetween.

10. The system according to claim 1, wherein said post assembly is movable along a track or groove formed in said fastening assembly.

11. The system according to claim 1, wherein each of said bird repellent systems comprises an intermediate wire support.

* * * * *